July 25, 1950

H. R. GREENLEE ET AL 2,516,203

TRANSMISSION

Filed Dec. 22, 1945

Neutral~Throttle Closed Engine Running

INVENTOR.
Harry R. Greenlee and Woodrow Haslany
BY
Brown Jackson Boettcher & Dienner
ATTORNEYS.

July 25, 1950     H. R. GREENLEE ET AL     2,516,203

TRANSMISSION

Filed Dec. 22, 1945     11 Sheets-Sheet 2

Neutral - Throttle Open - Engine Running

INVENTOR.
Harry R. Greenlee and Woodrow A. Husbany
BY
Brown Jackson Boettcher Dienner
ATTORNEYS.

Third Speed ~ Throttle Open ~ Shift Completed

INVENTOR.
Harry R. Greenlee and Woodrow H. Haslam

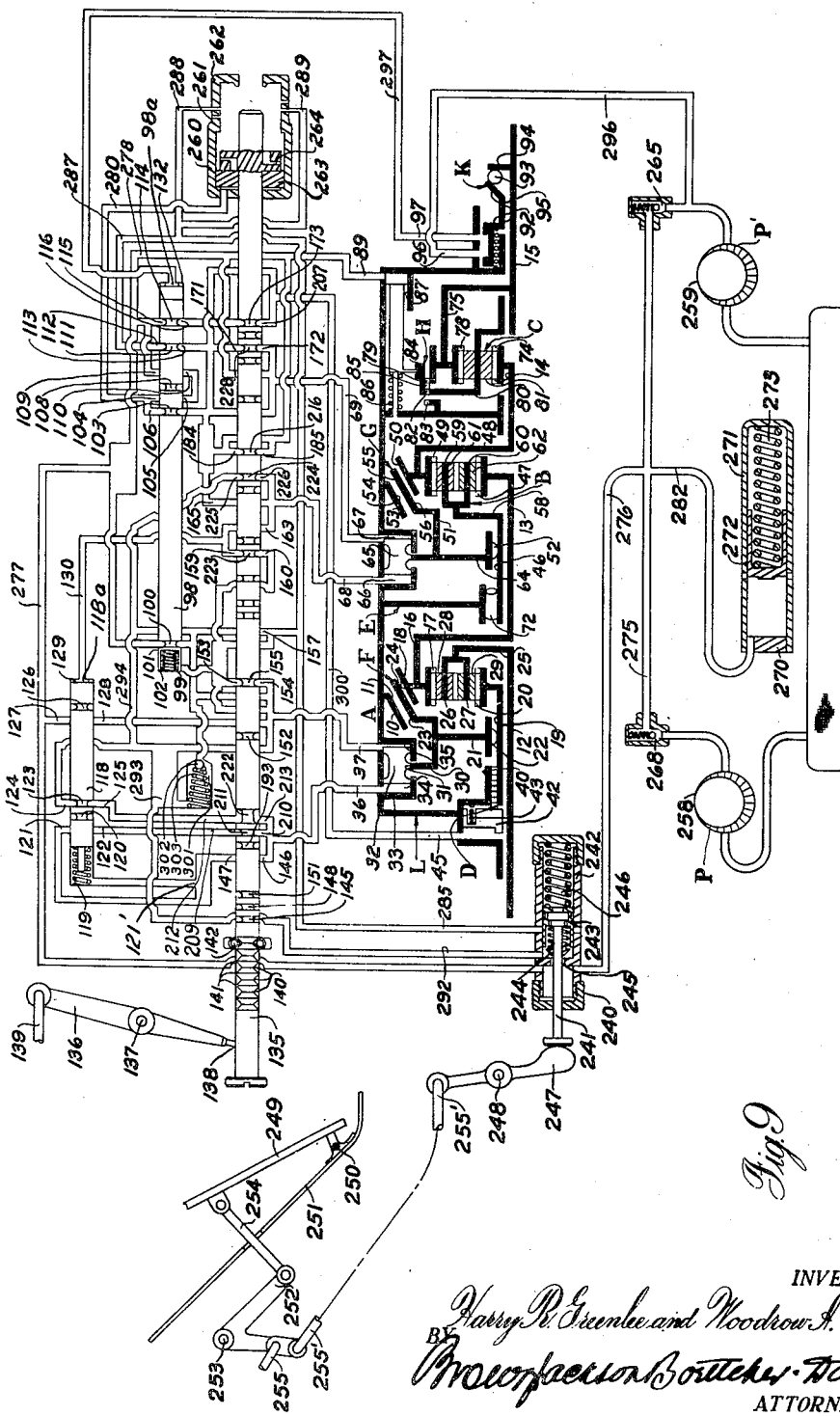

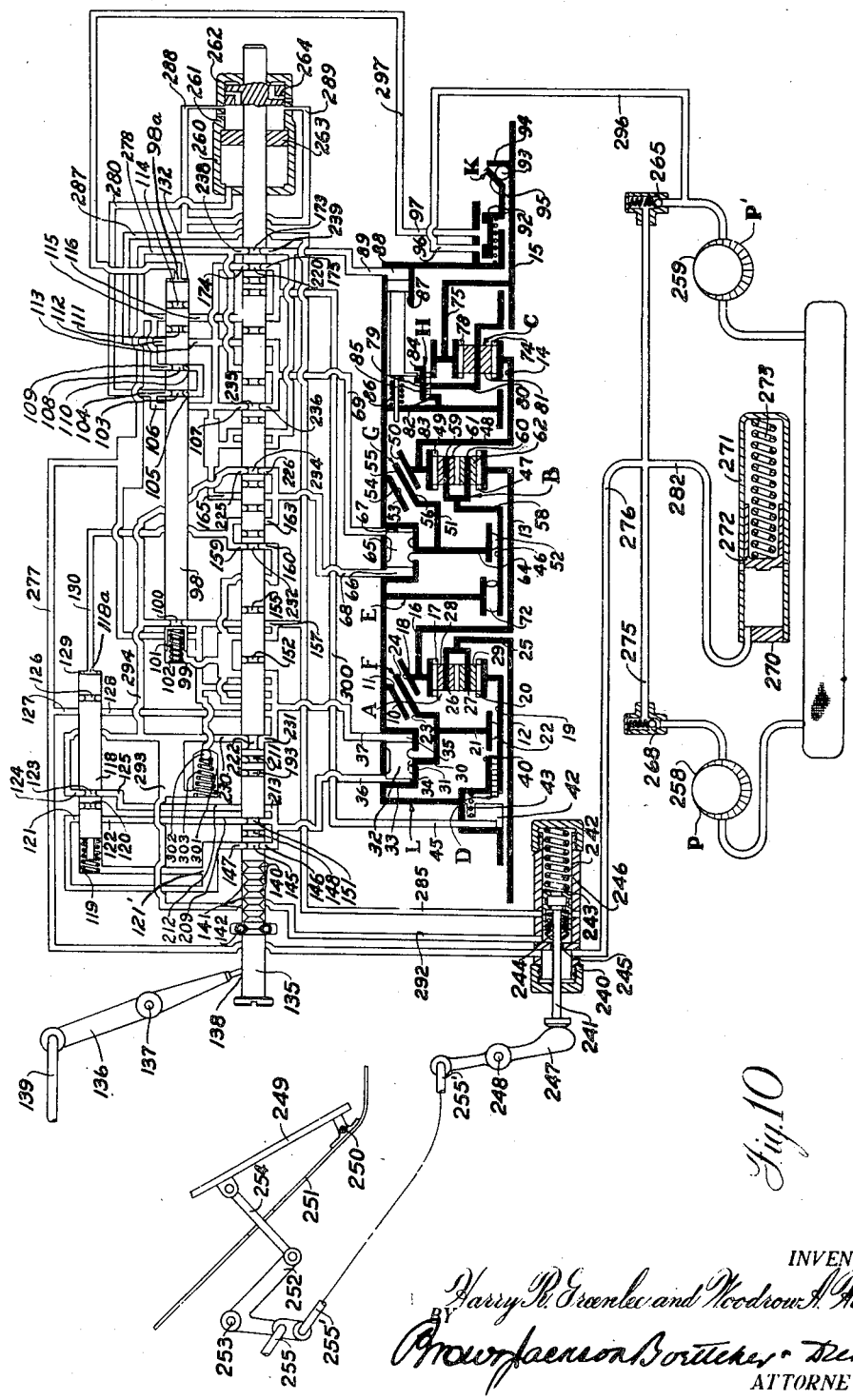

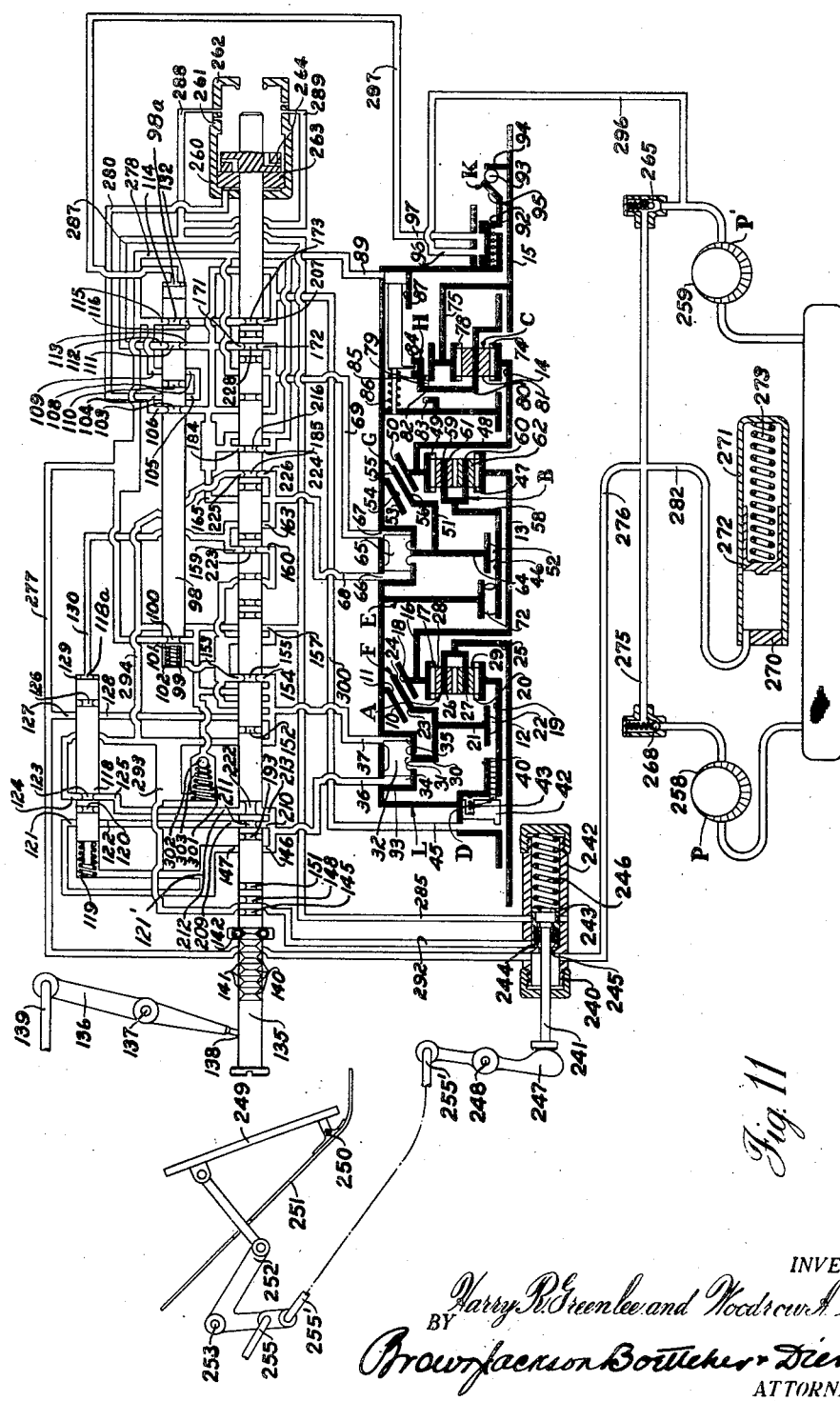

Patented July 25, 1950

2,516,203

UNITED STATES PATENT OFFICE 2,516,203

TRANSMISSION

Harry R. Greenlee, Indianapolis, and Woodrow A. Hasbany, South Bend, Ind., assignors to The Studebaker Corporation, South Bend, Ind., a corporation of Delaware Application December 22, 1945, Serial No. 636,722

17 Claims. (Cl. 74—472)

This invention relates, in general, to transmissions, and has particular reference to an improved automotive transmission.

One of the main objects of the present invention is to provide a full transmission providing for a plurality of forward speeds and reverse, and embodying the invention disclosed and claimed in the copending application of Harry R. Greenlee, Serial No. 568,593, filed December 18, 1944, now Patent No. 2,437,517.

Another object of the invention is to provide an improved form of full planetary transmission giving four speeds forward and one reverse.

Another object of the invention is to provide in a transmission of the class described three planetary gear sets, a helical spring brake, a conventional roller type free wheel unit, a pair of double acting cone friction clutches and brakes, a jaw clutch and governor means for providing the various drives through the transmission.

Another object of the invention is to provide a first gear ratio through the first and second gear sets, the third gear set being locked.

Another object of the invention is to provide a second gear ratio through the second gear set only, the first and third gear sets being locked.

Another object of the invention is to provide a third gear ratio through the first gear set only, the second and third gear sets being locked.

Another object of the invention is to provide a fourth speed or direct drive through the transmission, all gear sets being locked.

Another object of the invention is to provide a reverse speed ratio through the first and third gear sets, the second gear set being locked.

Another object of the invention is to provide an improved liquid or fluid pressure system for operating the transmission to its different positions.

Another object of the invention is to provide, in combination with the liquid or fluid pressure system for operating the transmission to its different positions, an improved combination of a manual shift valve, a throttle control valve, an overlap valve, a governor valve, and cylinders and ducts for securing the various operating positions of the transmission by the simple expedient of operating the accelerator and/or moving the manual shift valve to its different positions.

Another object of the invention is to provide an improved form of transmission of the class described in which there will be a means for breaking the drive line at will (of the type of transmission which is shiftable under torque load without breaking the drive line) for a sufficient period of time that the device's own clutches may be used, in either direction, as master clutches, after which the free wheeling member is reinstated and the unit may again function as a transmission shiftable under torque load without breaking the drive line.

Another object of the invention is to provide an improved form of transmission of the class described in which the shiftable torque transmitting member is engaged, prior to energizing the spring brake and before locking same against rotation, softly and without chatter or jerking.

Another object of the invention is to provide a combined helical spring brake and outer cone brake members fixed, for example, to the housing of the transmission for locking the shiftable torque transmitting members against rotation; also means for bringing the helical spring brake into action after the outer cone brake member has ceased to rotate.

Another object of the invention is to provide for engagement of the shiftable cone member with the ring gear before engaging the spring brake for direct drive.

Another object of the invention is to provide for blocking off in neutral, throttle closed, engine running position of the transmission any movement of the manual shift valve except to first or reverse.

Another object of the invention is to assure the use of the front cone clutch and brake as a master brake for starting the car, and, more particularly, to provide for applying pressure to shift the manual shift valve to first speed position if the car is in second, third, or fourth speed position and the speed of the car drops, for example, below about 10 M. P. H.

Another object of the invention is to provide for applying spring pressure on the jaw clutch of the third planetary gear set to keep that gear set locked in direct at all times except for reverse.

Another object of the invention is to provide a governor valve having a two step area for assuring a completed valve shift as soon as this valve starts to move.

Another object of the invention is to provide for completing a shift under torque from first to second without breaking the drive line.

Another object of the invention is to provide for applying overlap pressure to insure the starting engagement of the rear cone ahead of release of the front cone in the third speed, throttle open, shift started position.

Further objects and advantages of the invention will appear from the following detailed description, taken in connection with the accompanying drawings in which.

Figure 3:
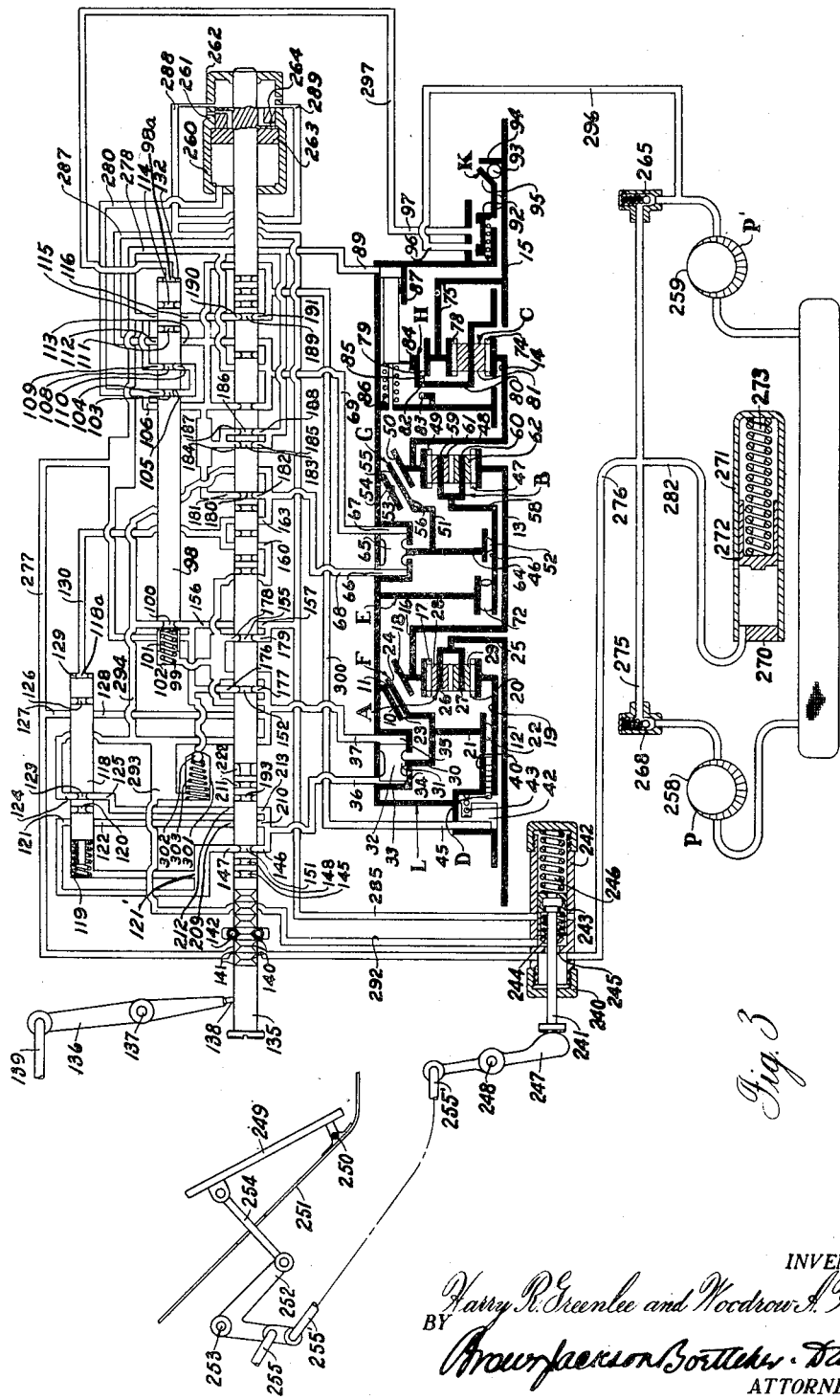
Figure 4:
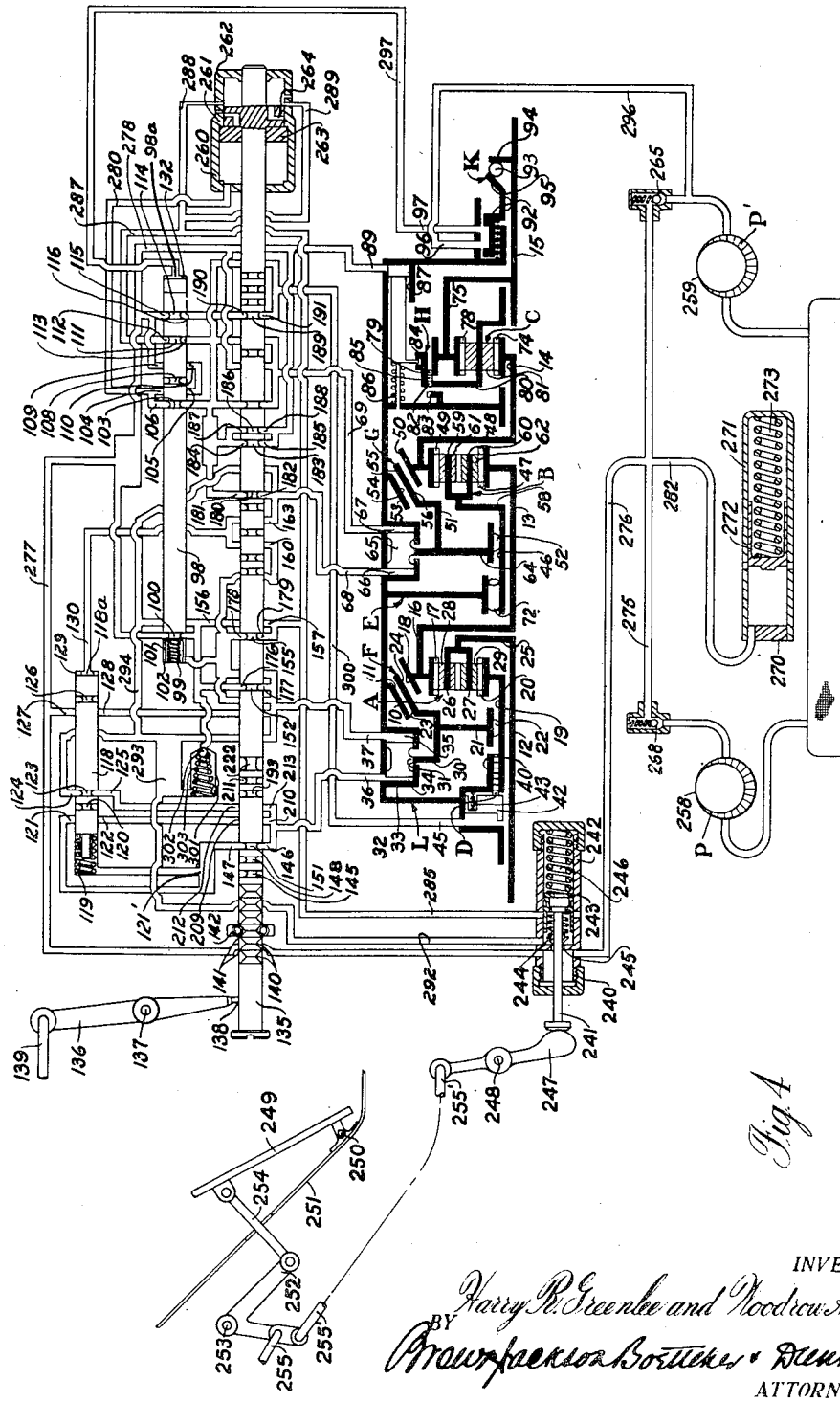
Figure 5:
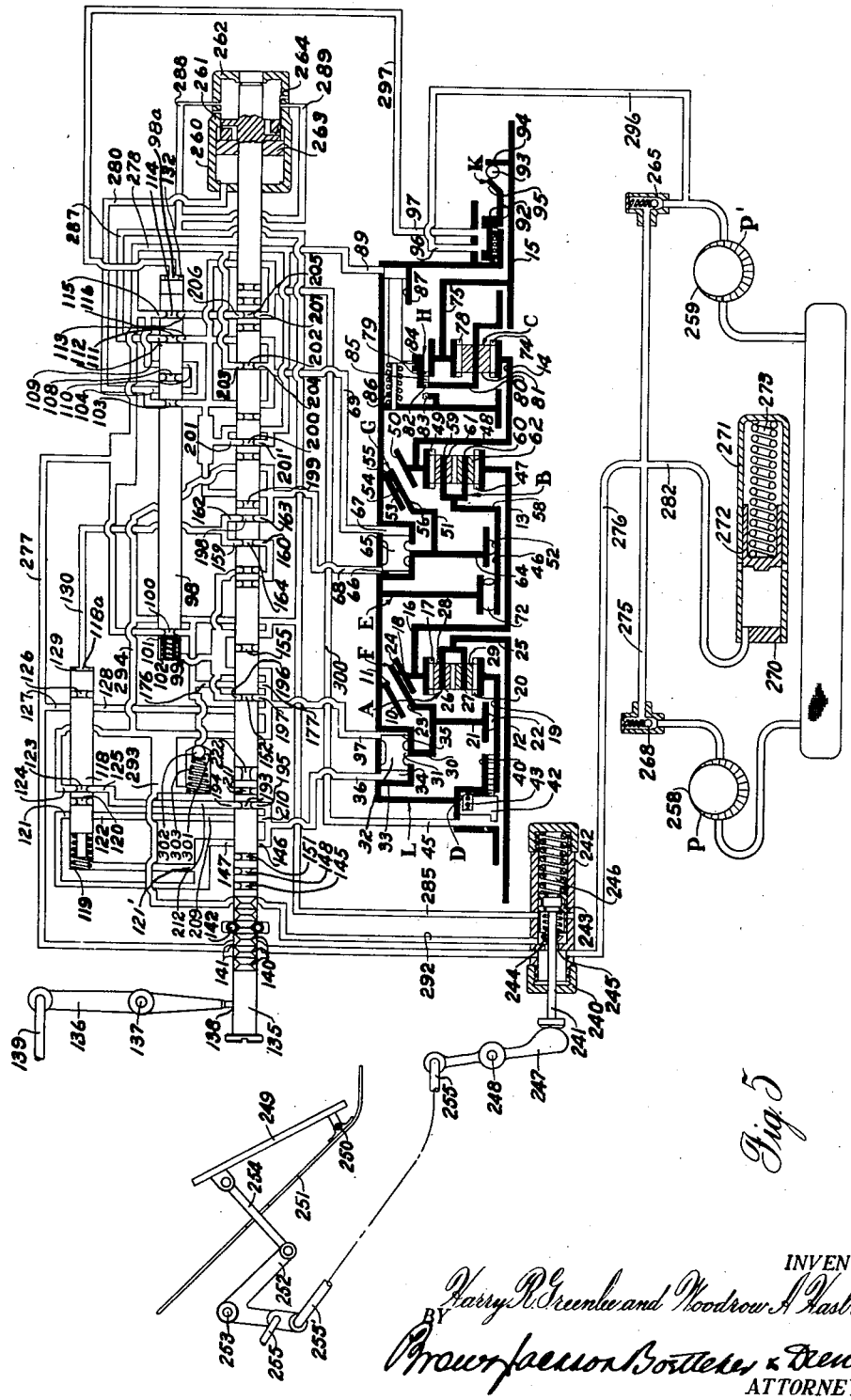
Figure 6:
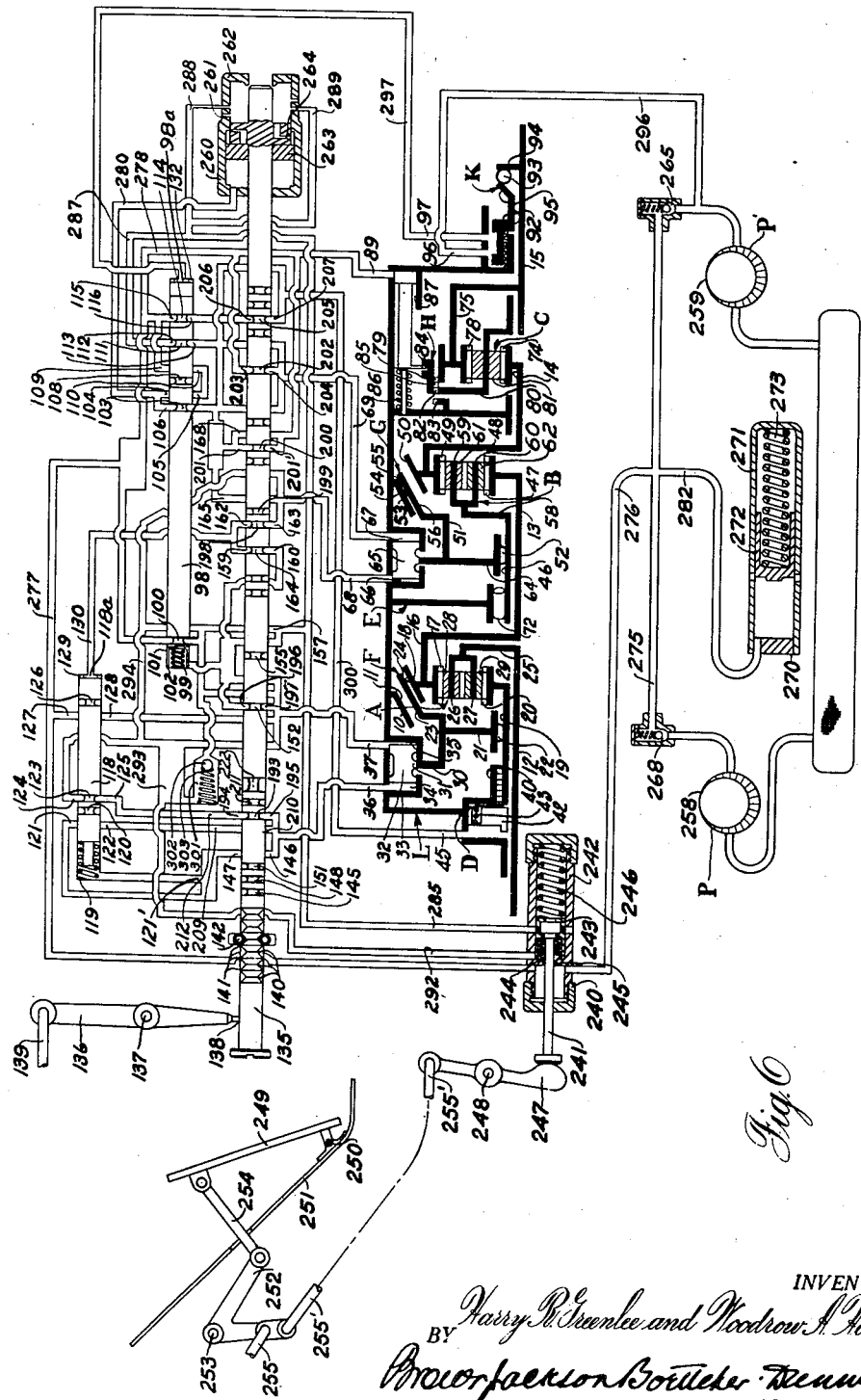
Figure 7:
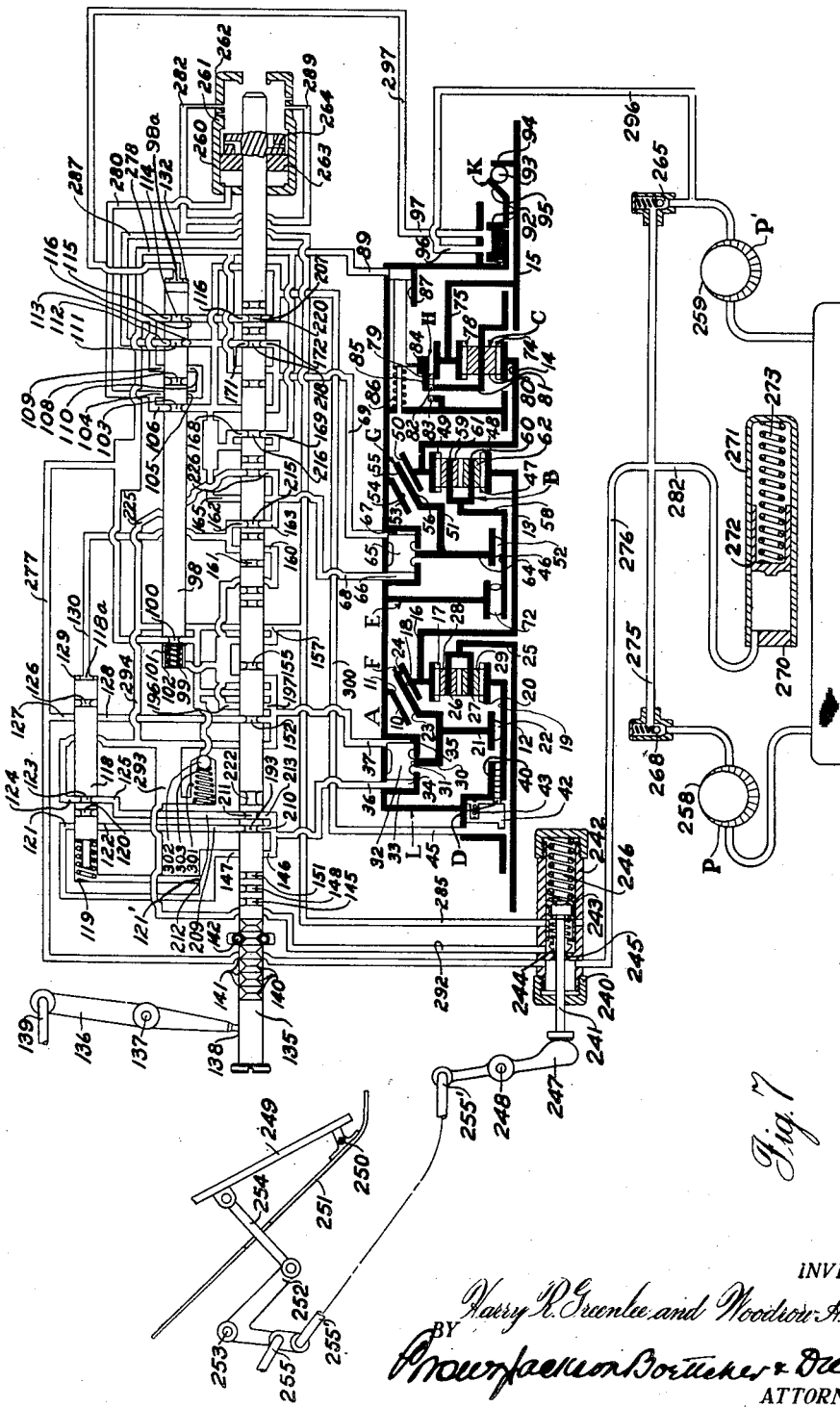
Figure 8:
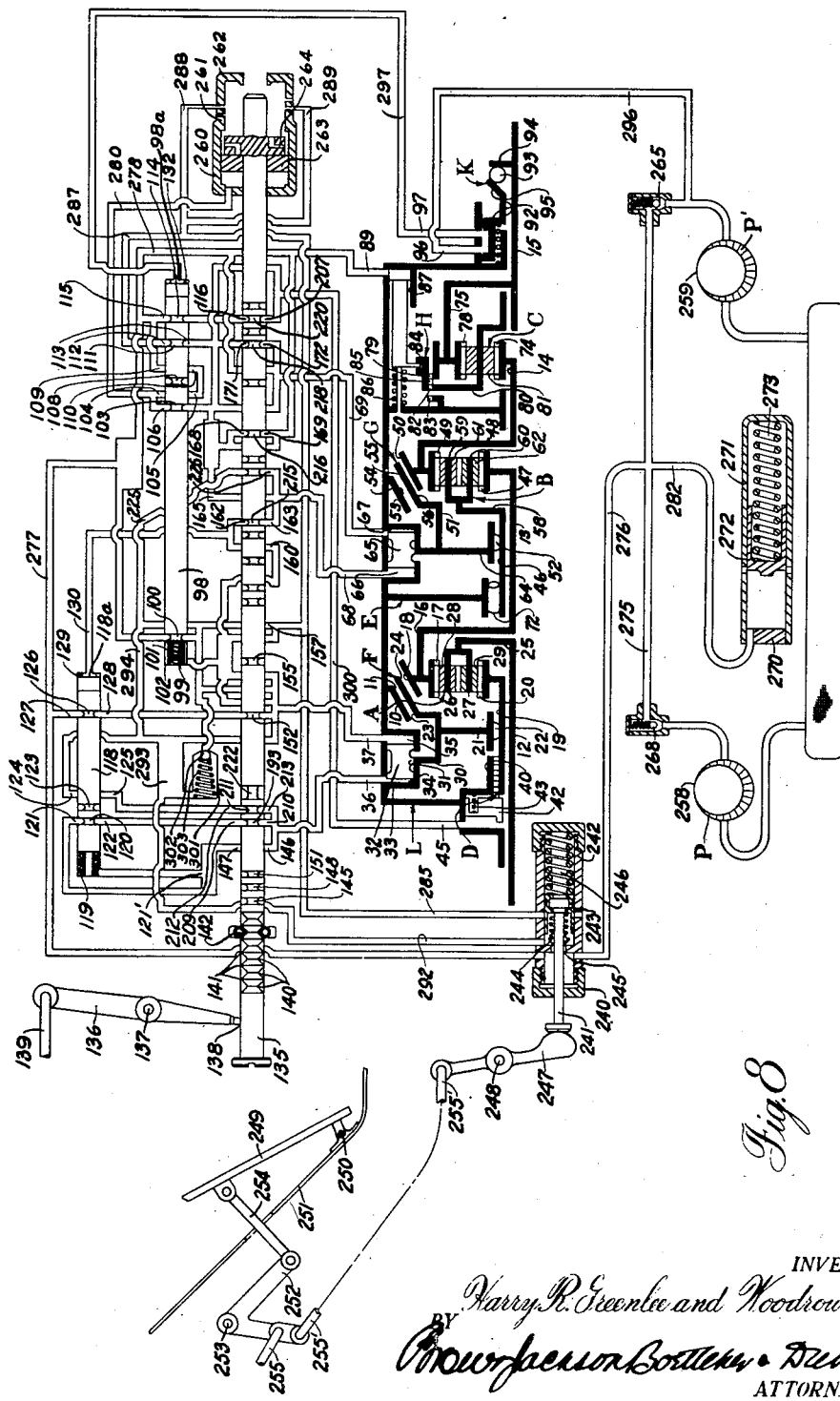

Figure 3 is a diagrammatic view showing the transmission in first speed, throttle open, car below 10 M. P. H. position;

Figure 4 is a diagrammatic view showing the transmission in first speed, throttle open, car above 10 M. P. H. position;

Figure 5 is a diagrammatic view showing the transmission in second speed, throttle open, car above 10 M. P. H. position;

Figure 6 is a diagrammatic view showing the transmission in second speed, throttle closed position;

Figure 7 is a diagrammatic view showing the transmission in third speed, throttle open, showing overlap position;

Figure 8 is a diagrammatic view showing the transmission in third speed, throttle open, shift completed position;

Figure 9 is a diagrammatic view showing the transmission in fourth speed, throttle open position;

Figure 10 is a diagrammatic view showing the transmission in reverse speed, throttle open position; and Figure 11 is a diagrammatic view showing the transmission in position for towing the car to start the engine with the shift lever in fourth speed.

With reference now to the drawings, the transmission which is illustrated diagrammatically, comprises three planetary gear sets A, B, and C, a helical free wheel spring brake D, a conventional roller type, free wheel unit E, two double acting cone friction clutches and brakes F and G, a jaw clutch and brake H, a governor K, and a transmission housing L.

The planetary gear set A, helical free wheel spring brake D, and the double acting cone friction clutch and brake F are of the type and are combined as more fully disclosed in the copending application of Harry R. Greenlee, Serial No. 568,593, filed December 18, 1944, now Patent No. 2,437,517, March 9, 1948.

The cone brake member 10 of the clutch and brake F is fixedly secured, for example, to the transmission housing L. The cone brake member 10 has an internal cone brake surface 11. The drive shaft is indicated diagrammatically at 12. A first driven shaft is indicated at 13, and a second driven shaft is indicated at 14. A third driven shaft is indicated at 15.

Formed integral with or fixed to the first driven shaft 13 is a torque transmitting member 16 having an internal ring gear 17 and an external cone clutch surface 18. A sleeve 19 is journaled for rotation about the drive shaft 12. This sleeve 19 has a sun gear 20 fixed thereto. A second torque transmitting member 21 is fixed against turning movement relative to the sun gear 20, for example, by splined engagement at 22 with external splines on the sleeve 19. The splined engagement at 22 permits axial shifting movement of the member 21 along the sleeve 19 and relative to the sun gear 20. The torque transmitting member 21 has an external cone brake surface 23 for engagement with the cone brake surface 11 of the fixed cone brake member 10, and an internal cone clutch surface 24 for engagement with the cone clutch surface of the ring gear 17.

A planetary arm 25 is formed integral with or fixed to the drive shaft 12, and carries planet pins 26 and 27. Planet pinions 28 are rotatably mounted on the planet pins 26 (only one of which is shown to simplify the illustration) and mesh with the ring gear 17. Planet pinions 29 are rotatably mounted on the planet pins 27 (only one of which is shown). The planet pinions 29 mesh with the pinions 28 and with the sun gear 20, as well understood in the art. Other forms of planetary or epicyclic gearing may, of course, be employed between the drive and first driven shaft 13 of the transmission within the scope of the present invention.

The torque transmitting member 21 is shifted axially or longitudinally along its splined connection at 22 with the sleeve 19 by a shifter arm 30 held or connected to the member 21, for example, by a bearing and suitable retainer rings (not shown) as in the copending application previously mentioned. At its opposite end the arm 30 is connected at 31 to a piston 32 which operates within a cylinder 33. The cylinder 33 has connections between its cylinder spaces 34 and 35 at opposite ends of the piston 32 and ducts 36 and 37 through which liquid or fluid pressure is introduced from the liquid or fluid pressure system into the cylinder spaces 34 and 35, as will be described. The piston 32 may be normally centered, for example, by coiled springs (not shown), as in the copending application previously mentioned.

A collar 40 is fixed to the housing L and surrounds the sleeve 19; there being an annular space between the collar 40 and the sleeve 19. The convolutions of the helical spring brake D surround the sleeve 19 and are disposed within the collar 40. One end of the spring D is fixed to the sleeve 19. At its opposite end the helical spring brake D is provided with a piston 42 which is held against rotation and is operable to actuate the helical spring brake D to cause the same to expand radially into braking engagement with the collar 40.

The piston 42 has a piston spring 43 for releasing the adjacent end of the helical spring D from engagement or connection with the collar 40, for example, as more fully illustrated and described in the previously mentioned copending application. In the inoperative position of the piston 42 the adjacent end of the spring D is free to rotate with the opposite end of the spring and the sleeve 19. When the piston 42 is in operative position it attempts to fix the adjacent end of the spring D or to retard rotation thereof. Due to the right hand helix of the spring D, if the sleeve 19 is revolving the same direction as the drive shaft 12, then the attempted retarding of the left hand end of spring D, as the device is illustrated diagrammatically in the drawings, merely acts to wind the spring D down tighter on the sleeve 19. If the sleeve 19 attempts to rotate in the opposite direction of the drive shaft 12, then the attempted retarding of the left hand end of the spring D causes the forward end of this spring to expand out against the inner periphery of collar 40. The piston 42 is actuated by the introduction of liquid or fluid pressure from the liquid or fluid pressure system into the cylinder therefor, for example, by means of a duct 45, as will hereinafter appear.

The secondary planetary gear set B is, in general, similar to the planetary gear set A. As already pointed out, the torque transmitting member 16 of gear set A is formed integral with or fixed to the first driven shaft 13. A sleeve 46 is journaled for rotation about the first driven shaft 13. The shaft 13 has a sun gear 47 fixed thereto. The second gear set B has a first torque transmitting member 48 formed integral with or fixed to the second driven shaft 14. The member 48 has an internal ring gear 49 and an external cone clutch surface 50. A second torque transmitting member 51 for the gear set B is fixed against turning movement relative to the sleeve 46, for example, by splined engagement at 52 with external splines on the sleeve 46. The splined engagement at 52 permits axial shifting movement of the member 51 along the sleeve 46 and relative to the sun gear 47.

The cone brake member 53 of the second clutch and brake G is fixedly secured, for example, to the transmission housing L. The cone brake member 53 has an internal cone brake surface 54. The torque transmitting member 51 has an external cone brake surface 55 for engagement with the cone brake surface 54 of the fixed cone brake member 53, and an internal cone clutch surface 56 for engagement with the cone clutch surface 50 of the ring gear 49.

A planetary arm 58 is formed integral with or fixed to the sleeve 46, and carries planet pins 59 and 60. Planet pinions 61 are rotatably mounted on planet pins 59 (only one of which is shown) and mesh with ring gear 49. Planet pinions 62 are rotatably mounted on planet pins 60 (only one of which is shown). The planet pinions 62 mesh with the pinions 61 and with the sun gear 47, as well understood in the art.

Other forms of planetary or epicyclic gearing may, of course, be employed between the first and second driven shafts 13 and 14 of the transmission within the scope of the present invention.

The torque transmitting member 51 is shifted axially or longitudinally along its splined connection at 52 with the sleeve 46 by a shifter arm 64 held or connected to the member 51, for example, by a bearing and suitable retainer rings (not shown), as described in connection with the torque transmitting member 21. At its opposite end the arm 64 is connected to a piston 65 which operates within a cylinder. The cylinder has connections between its cylinder spaces 66 and 67, at opposite ends of the piston 65, and ducts 68 and 69, through which liquid or fluid pressure is introduced from the liquid or fluid pressure system into the cylinder spaces 66 and 67, as will be described.

The piston 65 may be normally centered, for example, by coiled springs (not shown), as described in connection with the piston 32.

The conventional roller type, free wheel unit E comprises, for example, overrunning or one-way brake means including rollers 72 between the sleeve 46 and the housing L. This roller type free wheel unit E may, for example, be of the type more fully shown and described in William S. James Patent No. 2,339,269, January 18, 1944, and William S. James Patent No. 2,351,213, June 13, 1944, or of any other suitable or preferred type. It acts to hold the sleeve 46 against turning in one direction, and to permit free turning of the sleeve in the opposite direction.

As already pointed out, the torque transmitting member 48 of the second gear set B is formed integral with or fixed to the second driven shaft 14. The shaft 14 has a sun gear 74 fixed thereto. The third gear set C has a torque transmitting member 75 formed integral with or fixed to the third driven shaft 15. The member 75 has an internal ring gear 78 and an external jaw clutch 79. A planetary arm 80 carries planet pinion 81 which mesh with the sun gear 74 and ring gear 78.

The planetary arm 80 also has an external jaw clutch 82. A further external jaw brake 83 is fixed, for example, to the housing L. A shiftable jaw clutch and brake member 84 has an internal jaw member 85 for engagement selectively with the jaw clutches 79, 82, and brake 83, as will hereinafter appear. The shiftable jaw member 84 is held, for example, in the position shown in Figures 1 to 9, inclusive, and 11 by a spring 86. The member 84 forms or has a piston which operates within a cylinder 87. The cylinder 87 has connection between its cylinder space 88 (shown in Figure 10) and a duct 89 through which liquid or fluid pressure is introduced from the liquid or fluid pressure system into the cylinder space 88 to shift the shiftable jaw member 84 to the position shown in Figure 10, as will be described.

Figure 1:
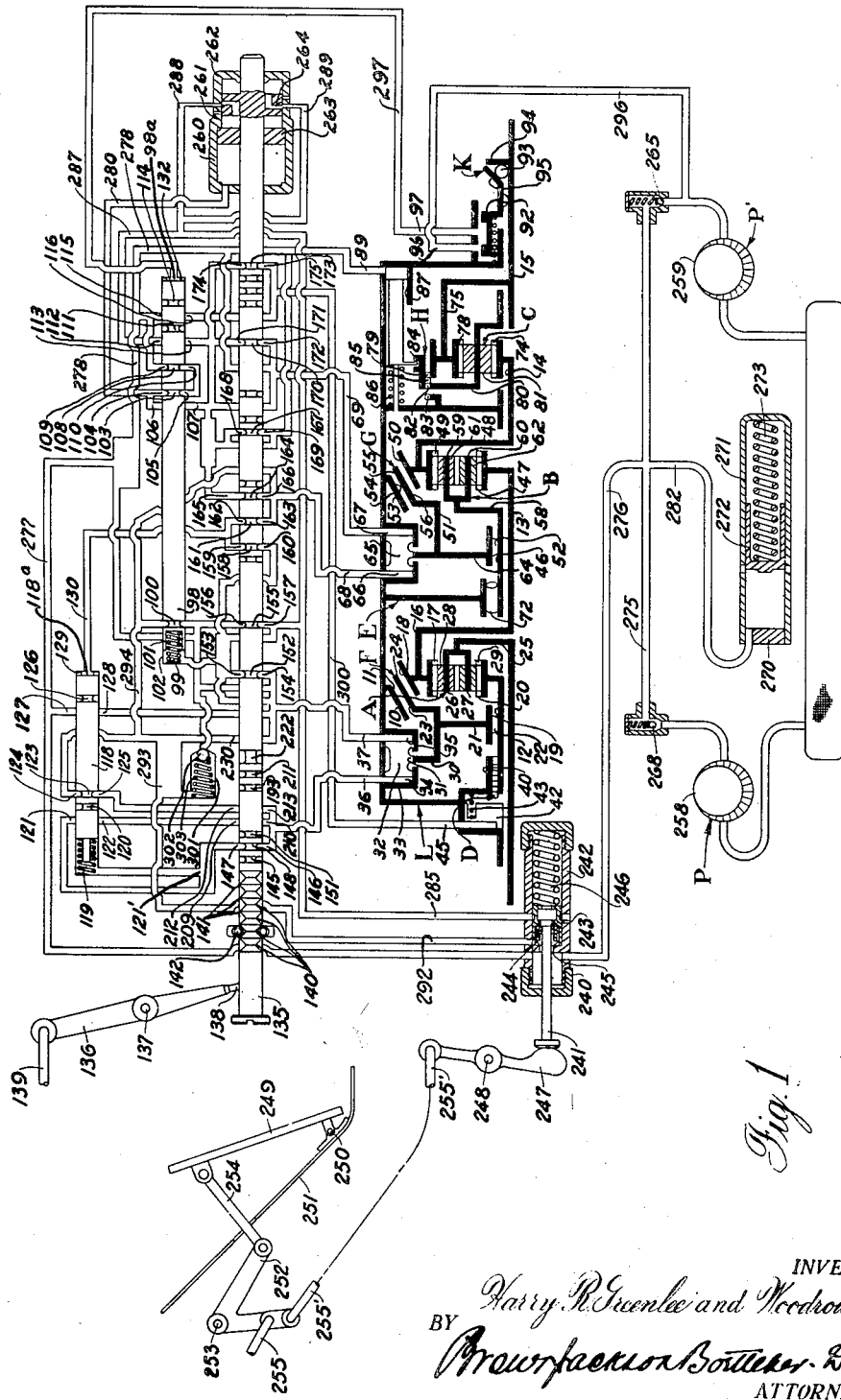
Figure 1 is a diagrammatic view of one form of transmission embodying the present invention, showing the same in neutral, throttle closed, engine running position.
Figure 2:
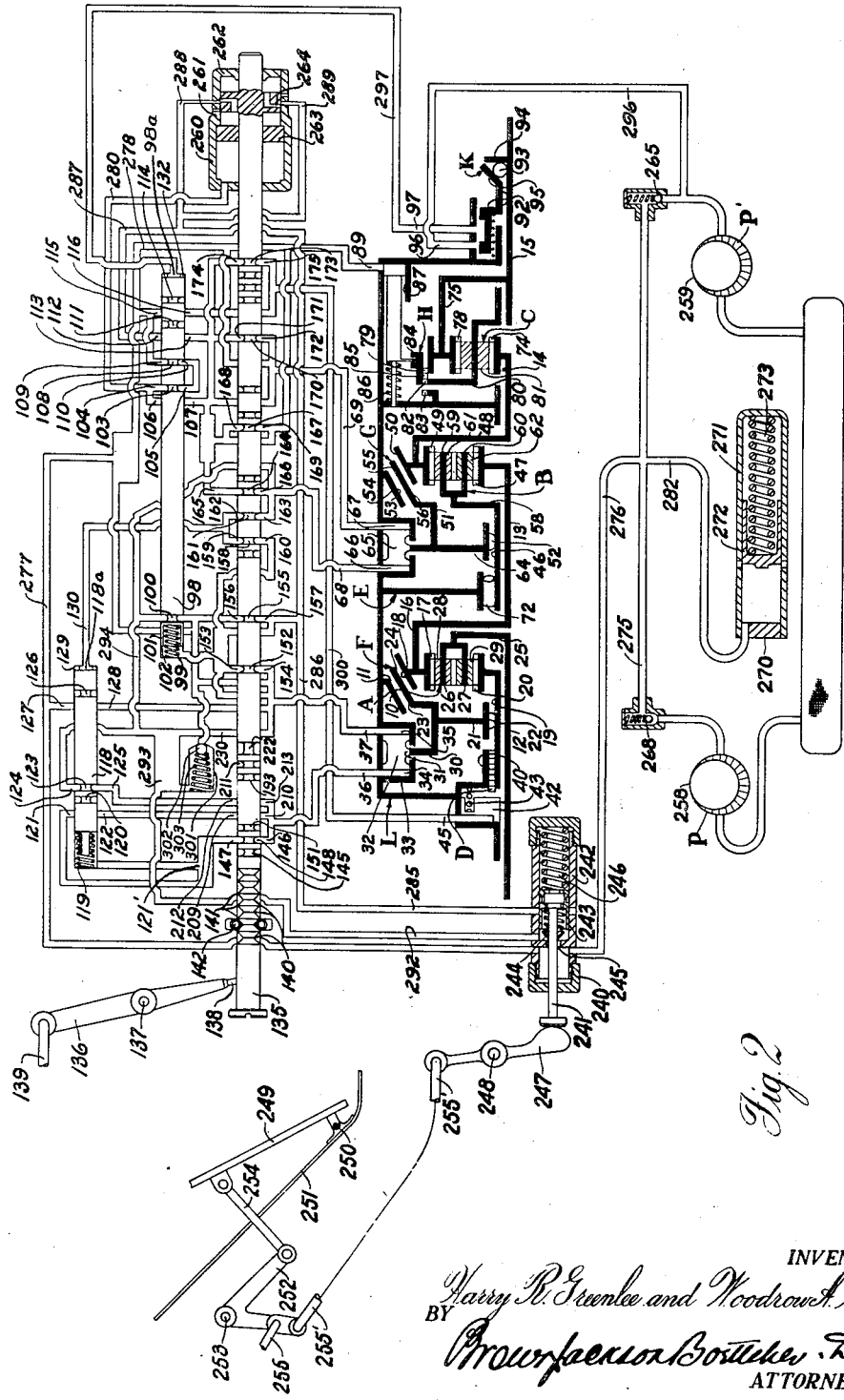
Figure 2 is a diagrammatic view showing the transmission in neutral, throttle open, engine running position.

The governor K comprises a shiftable valve member 92 which upon attainment of a predetermined speed of the third driven shaft 15 is shifted from the position shown in Figures 1, 2, and 3, to the position shown in Figures 4 to 9, inclusive. This shifting of the valve member 92 may be accomplished, for example, by centrifugal or flyball members 93 operable between a flange 94, on the shaft 15, and a conical inclined flange 95 on the valve member 92. An inlet duct 96 leads to the governor for supplying liquid or fluid pressure thereto, and when the valve member 92 is actuated to the position shown in Figure 4 this inlet duct 96 is placed in communication with an outlet duct 97, thus admitting pressure from the rear pump P' to a governor valve 98 to move the valve 98 to the left, as the device is viewed in the drawings, against spring pressure.

The movement of the governor valve 98 to the left is against the pressure of a spring 99. The valve 98 has an annular groove or reduced portion 100 carrying a cup-shaped piston 101 which operates within a cylinder 102. The spring 99 is confined endwise between the closed end of the piston 101 and the opposite end of the cylinder 102. The right hand end of governor valve 98 as shown diagrammatically in the drawings is formed with an end recess 98a defining an area less than the cross-sectional area of the valve 98 against which pressure of the fluid is conducted thereto through ducts 97 and 297 is adapted to act. When fluid under pressure is admitted at the right hand end of valve 98 it initially acts against the small exposed area provided by the end recess 98a and when the valve 98 begins to move to the left against the force of spring 99 the entire cross-sectional area of the right hand end of valve 98 is exposed to the fluid under pressure to complete the shift of the valve to its left hand position. The fluid under pressure initially acting against the smaller area of valve 98 formed by the recess 98a in an amount sufficient to overcome the force of spring 97 assures completing the shifting of valve 99 to its left hand position upon the entire cross-sectional area of the valve 99 being exposed to the fluid under pressure delivered through ducts 97 and 297. The governor valve 98 thus has a two step area for a purpose which will hereinafter appear. It also has an annular groove 103 for placing a liquid or fluid pressure duct 104 in communication with a duct 105, and a liquid or fluid pressure duct 106 in communication with a duct 107. The governor valve 98 also has an annular groove 108 for placing liquid or fluid pressure duct 109 in communication with a duct 110; an annular groove 111 for placing a duct 112 in communication with a duct 113, and an annular groove 114 for placing a duct 115 in communication with a duct 116.

An overlap valve 118 is held in the position shown in Figures 1 to 7, inclusive, and returned to this position by a spring 119. This valve 118 is shifted hydraulically to the position shown in Figure 8, as will hereinafter apear, to complete the shift to third speed. The overlap valve 118 has an annular groove 120 for placing a duct 121 in communication with a duct 122; an annular groove 123 for placing a duct 124 in communication with a duct 125; and an annular groove 126 for placing a duct 127 in communication with a duct 128. The duct 121 has connection with a bleed sump shown at 121'. The valve 118 operates within a cylinder 129, and, as will hereinafter appear, liquid or fluid pressure is admitted into this cylinder against the right hand end of the valve 118 as it is viewed in the drawings, through a duct 130. The governor valve 98 operates within a cylinder 132, and, as will hereinafter appear, liquid or fluid pressure is admitted into this cylinder against the right hand end of the valve 98 through the ducts 97 and 297.

A manual shift valve 135 has neutral position as shown in Figures 1 and 2, first speed position as shown in Figures 3 and 4, second speed position as shown in Figures 5 and 6, third speed position as shown in Figures 7 and 8, fourth speed position as shown in Figure 9, reverse position as shown in Figure 10, and towing position which corresponds to fourth speed position and is shown in Figure 11.

The shift lever 136 is pivoted at 137 on the transmission housing L, or otherwise as desired, and has suitable connection at 138 with the manual shift valve 135 for shifting the latter axially. The lever 136 may be actuated through a link 139 by a gear shift control lever (not shown) mounted, for example, on the steering post of the vehicle, or otherwise as desired.

The manual shift valve or rod 135 is provided with a plurality of substantially V-shaped grooves 140, one corresponding to each of the different positions of this valve. The grooves 140 form therebetween a plurality of annular ridges 141 substantially V-shaped in cross section. An annular coil spring or garter spring 142 is of a normal diameter to fit partially within the grooves 140 of the rod or valve 135. The plurality of grooves 140 and ridges 141 provide definite selected positions of the valve or rod 135 which provides for selective conditioning of the transmission to provide selected forward gear ratios, reverse, and neutral positions in the manner to be hereinafter described.

The manual shift valve 135 has an annular groove 145 for placing a duct 146 in communication with a duct 147 for reverse; an annular groove 148 for placing duct 146 in communication with duct 147 for neutral; and an annular groove 151 for placing duct 146 in communication with duct 147 for first speed.

In neutral position of the valve 135, an annular groove 152 in valve 135 places a duct 153 in communication with a duct 154; an annular groove 155 places a duct 156 in communication with a duct 157; an annular groove 158 places a duct 159 in communication with a duct 160; an annular groove 161 places a duct 162 in communication with a duct 163; an annular groove 164 places a duct 165 in communication with a duct 166; an annular groove 167 places a duct 168 in communication with a duct 169; an annular groove 170 places a duct 171 in communication with a duct 172; and an annular groove 173 places a duct 174 in communication with a duct 175.

In first speed position of the valve 135 (Figures 3 and 4), annular groove 152 places ducts 176 and 177 in communication; annular groove 155 places ducts 178 and 179 in communication; annular groove 180 places ducts 181 and 182 in communication; annular groove 183 places ducts 184 and 185 in communication; annular groove 186 places ducts 187 and 188 in communication; and annular groove 189 places ducts 190 and 191 in communication.

In second speed position of the valve 135 (Figures 5 and 6), annular groove 193 places ducts 194 and 195 in communication; annular groove 152 places ducts 196 and 197 in communication; annular groove 164 places ducts 159 and 160 in communication; annular groove 198 places ducts 162 and 163 in communication; annular groove 200 places ducts 201 and 201' in communication; annular groove 202 places ducts 203 and 204 in communication; and annular groove 205 places ducts 206 and 207 in communication.

In third speed position of the valve 135 (Figures 7 and 8) annular groove 193 places ducts 209 and 210 in communication; annular groove 211 places ducts 212 and 213 in communication; annular groove 152 places ducts 37 and 128 in communication; annular groove 215 places ducts 162 and 163 in communication; annular groove 216 places ducts 168 and 169 in communication; annular groove 218 places ducts 171 and 172 in communication; and annular groove 220 places ducts 116 and 207 in communication.

In fourth speed position of the valve 135 (Figure 9) annular groove 211 places ducts 209 and 210 in communication; annular groove 222 places ducts 212 and 213 in communication; annular groove 155 places ducts 153 and 154 in communication; annular groove 223 places ducts 159 and 160 in communication; annular groove 224 places ducts 225 and 226 in communication; annular groove 216 places ducts 184 and 185 in communication; annular groove 228 places ducts 171 and 172 in communication; and annular groove 173 places ducts 116 and 207 in communication.

In reverse position of the valve 135 (Figure 10) annular groove 145 places ducts 146 and 147 in communication; annular groove 151 places ducts 122 and 36 in communication; annular groove 222 places ducts 230 and 231 in communication; annular groove 232 places ducts 159 and 160 in communication; annular groove 234 places ducts 225 and 226 in communication; annular groove 235 places ducts 107 and 236 in communication; annular groove 220 places ducts 174 and 175 in communication; and annular groove 173 places ducts 238 and 239 in communication.

The throttle control valve 240 comprises a cylinder 242 within which a throttle control valve shaft 241 operates. The shaft 241 has operating within the cylinder 242 a piston 243 and a valve member 244 which controls a port 245. A coiled spring 246 is interposed between the right hand end of the piston 243 and the cap or wall at the right hand end of the cylinder 242, as the device is viewed in the drawings. The throttle valve shaft 241 is actuated by a lever 247 which is pivoted at 248 and, in turn, is actuated by the conventional throttle control pedal 249 pivoted, for example, at 250 on the floor board 251 of the vehicle.

Upon being depressed, the foot pedal 249 swings a bell crank lever 252 (clockwise as viewed in the drawing) about its pivotal mounting at 253 through a connecting link 254 connected between the pedal 249 and one arm of the lever 252. The other arm of the lever 252 is connected by a link 255 with the throttle of the engine for the vehicle, and with the lever 247 by a link 255'. As a result, with the engine running, depression of the pedal 249 accelerates the engine through the throttle control and operates the throttle control valve 240, as will hereinafter appear.

A main shaft oil or other liquid or fluid pressure pump 258 is located at the front and driven by the main shaft, and a tail shaft oil or other fluid pressure pump 259 is located at the rear and driven by the tail shaft. A valve block (not shown), located, for example, on the left hand side, preferably houses the manual shift valve 135, the governor valve 98, the overlap valve 118, the throttle control valve 240, and shift interlocking means, although this may, of course, vary.

The shift interlocking means comprises cylinders 260, 261, and 262, shown at the right hand end of the manual shift valve 135, as the device is viewed in the drawings. The cylinder 260 has a piston 263 operating therein. The manual shift valve 135 is movable relative to the piston 263 from neutral position, shown in Figures 1 and 2, to first speed position, shown in Figures 3 and 4, and to reverse position shown in Figure 10. Shift valve 135, however, carries ported piston means 264 which operates within cylinders 261 and 262, and cooperates with the piston 263, as will hereinafter appear.

A check valve is provided at 265 for preventing oil from the front pump 258 from going through the rear pump 259 in neutral and reverse positions. A check valve is provided at 268 for preventing oil from the rear pump 259 from going through the front pump 258, as will be apparent as this description proceeds. An oil or fluid pressure accumulator 270 has a cylinder 271 within which a piston 272 operates. A spring 273 operates against the piston 272, and is set, for example, to produce about 80 pounds line pressure, although this may of course vary.

The ducts, not already specifically mentioned in the foregoing description, will be referred to and identified in the description of the operation of the transmission which, in general, is as follows:

Briefly, the first gear ratio is through the first and second gear sets A and B, the third gear set C being locked. The second gear ratio is through the second gear set B only, the first and third gear sets A and C being locked. The third gear ratio is through the first gear set A only, the second and third gear sets B and C being locked. The fourth or direct drive is straight through, all gear sets A, B, and C being locked. The reverse speed ratio is through the first and third gear sets A and C, the second gear set B being locked.

*Neutral—throttle closed engine running*

With the valve 135 in neutral position, the throttle closed, and the engine running, as shown in Figure 1, the front pump 258 feeds pump pressure to the piston 263 through the ducts 275, 276, 277, 278, 115, 109, 110, 105, 104, and 280. The surplus oil from the front pump 258 is by-passed through duct 282 and accumulator 270 whose spring 273 is set, as previously described. However, the front pump 258 cannot supply full 80 pounds pressure until the accumulator is filled, with the piston 272 in by-pass position with respect to the bleed ports shown in cylinder 271. The rear pump 259 is not operating in neutral—throttle closed, engine running position, and oil from the front pump 258 is prevented from going through the rear pump 259 by means of the check valve 265.

The pressure thus applied to the piston 263 blocks off any movement of the manual shift valve 135 except to first or reverse positions. This always assures the use of the first or front cone clutch F as a faster clutch for starting the car, because if the transmission is in second, third, or fourth position and the vehicle drops below 10 M. P. H., the pressure will be applied to the cylinder 260 to shift the lever down to first speed through the cooperation of the piston 263 dictated by governor K through the governor valve 98.

The helical spring brake D is not energized, thus permitting the front cone clutch F to revolve in the opposite direction from that of the engine of the vehicle.

Any tendency of the rear cone clutch to revolve in the opposite direction from that of the engine is prevented by the roller free wheel unit E. The spring pressure on the jaw clutch of the third planetary gear set C keeps that gear set locked in direct at all times except for reverse. The cylinder spaces 34, 35, 66, 67, and 88 are all in bleed through the ducts 36, 37, 68, 69, and 89, as is the cylinder space for the piston 42 through the duct 45 for releasing the helical spring D.

*Neutral—throttle open, engine running*

The neutral—throttle open, engine running position, as illustrated in Figure 2, is the same as the neutral—throttle closed, engine running position, except as follows:

As the throttle is opened, the bleed at the throttle control valve shaft 241 is closed off in the cylinders 261 and 262. At the same time, variable pressure caused by the same movement of this shaft enters these cylinders 261 and 262 through ducts 285, 286, 287, 288, and 289, which blocks any attempted shift in either direction.

If, on the other hand, the manual shift toward first or reverse has been only started, the variable pressure forces the neutral interlock valve back to neutral, making it impossible to have a partial shift.

*First speed—throttle open—car below 10 M. P. H.*

This speed is obtained by moving the manual shift valve 135 to its first speed position, as illustrated in Figure 3. This movement permits the cylinder spaces 261, 262, 34, 66, 67, and 88 to bleed through their connected ducts. The piston 263 remains under regulated pump pressure through the ducts 275, 276, 277, 278, 115, 109, 110, 105, 104, and 280, as previously described, to prevent a shift of the manual shift valve 135 above first speed (below 10 M. P. H.).

Upon depressing the accelerator pedal 249, the throttle control valve 240 admits variable pressure to the cylinder space 35 through ducts 292, 293, 294, 156, 176, 177, and 37, which moves torque transmitting member 21 to engage the external cone brake surface 11 of the cone brake member 10, as shown in Figure 3. This starts the car. If during a fast start more oil is needed than the front pump 258 provides at this time, the accumulator 270 furnishes an added volume.

As the front cone brake F thus engages and starts the car, the rear oil pump 259 rotates, thus adding its volume to the main pressure line.

If (below 10 M. P. H.) the throttle is closed, the car will free wheel because of either of the following:

a. The throttle control valve 240 will stop the variable pressure to the cylinder space 35, causing the brake F to lose its torque carrying capacity; or b. Since no pressure is being applied to the cylinder spaces 66 or 67, the second planetary gear set B may free wheel because of the roller type free wheel unit E.

*First speed—throttle open—car above 10 M. P. H.*

The first speed, throttle open, car above 10 M. P. H. position, as illustrated in Figure 4, is the same as the first speed, throttle open, car below 10 M. P. H. position, except as follows:

The governor K opens to admit oil pressure from the rear pump 259 to the governor valve 98 through ducts 296 and 297, thereby moving the governor valve 98 to the left against the pressure of the spring 99. As illustrated and already explained, the governor valve 98 has a two step area which assures a completed valve shift as soon as the valve starts to move, i. e., the secondary is sufficient to overcome the pressure of the valve spring 99 during this movement of the valve 98, which, in actual practice, is about 1/16 of an inch. This movement of the governor valve 98 also disconnects the ports 104 and 110, and thus prevents regulated pump pressure from entering the cylinder 260. If, for example, when driving in second, third or fourth or on icy roads the brakes are applied and the rear wheels stop rotating, then the pressure to the governor valve 98 drops to zero and the valve is returned by the spring 99 to reestablish first speed with manual shift valve 135, and thus free wheel, as explained previously.

The cylinder 260 is now in bleed through the ducts including duct 280, as shown in Figure 4, instead of being under pressure. This permits the manual shift valve 135 to be moved to second, third, or fourth positions.

Regulated pump pressure, instead of variable pressure, is now applied to the cylinder space 35 through ducts 276, 277, 156, 176, 177, and 37. This assures a continuous brake engagement at 11, 23 in first speed above 10 M. P. H. The car will still free wheel, however, because of the roller type free wheel unit E.

Regulated pump pressure, instead of bleed, is now on the helical spring brake D through the ducts 276, 277, 278, 115, 116, 190, 191, 300, and 45, and against the piston 42. The piston 42 thrusts the engaging washer for the helical spring brake against the case, making it ready to hold the cone reaction when a shift is made in its planetary unit A.

At the time the governor valve 98 trips, regulated pump pressure from accumulator 270 is fed to the ball-type constant pressure valve 301.

The ball type constant pressure valve 301 comprises a ball check valve 302 and conical spring 303. The spring is adjusted to regulate pressure sufficient to hold brake surfaces 11 and 23 in engagement during coast or deceleration, at which time variable pressure would be lower than the required holding pressure. While this feature is not used to prevent free wheeling in first speed, it is mentioned here because it occurs at this time. In short, above 10 M. P. H. there is always a constant predetermined pressure in the variable pressure chamber 293 until the throttle control valve 244 is opened sufficiently to overcome it.

*Second speed—throttle open—car above 10 M. P. H.*

This speed is obtained by moving the manual shift valve 135 to the second speed position illustrated in Figure 5.

The cylinder space 35, which has regulated pump pressure, is now disconnected from pump pressure by disconnection of ducts 176, 177 at the valve 135. The space 35 now becomes bleed through duct 37. The pressure which remains on helical spring brake D through piston 42 above 10 M. P. H. in all forward speeds causes the helical spring brake to function as a conventional free wheel unit. Therefore, changing cylinder space 35 into bleed does not affect the drive because the cone clutch and brake F is held from rotating backwards by the free wheel unit. Up to this point the cone brake at F has been used only as a master brake for starting the car.

The cylinder space 34 is now under variable pressure through ducts 292, 293, 124, 125, 194, 195, and 36 instead of in bleed, and, as the pressure increases sufficiently to engage cone clutch surface 24 with the cone clutch surface 18 of planetary ring gear 17, the cone merely overruns its free wheel unit, which results in second speed through the second planetary gear set B only. The cone brake surface 55 of the second gear set B is in engagement with the cone brake surface 54 of the fixed cone brake member 53. Thus a shift under torque from first to second is completed without breaking the drive line.

*Second speed—throttle closed*

The second speed—throttle closed position, illustrated in Figure 6, is the same as the second speed—throttle open position just described except that, when the accelerator is released, the throttle control valve at 240 closes, shutting off variable pressure; but as soon as variable pressure drops below that dictated by the constant pressure valve at 301, then that line takes over and the clutch F remains engaged and prevents the car from free wheeling.

*Third speed—throttle open—showing overlap*

This speed is obtained by moving the manual shift valve 135 to the third speed position illustrated in Figure 7. The cylinder space 34 remains under variable pressure, as already described, and ports 196, 197 are disconnected at valve 135 so that cylinder space 35 is not anything, i. e., is not in bleed or under pressure. Since cylinder space 35 is neither in bleed nor under pressure, it does not affect anything, but this condition exists only during a timing overlap, which is very short.

Cylinder space 67, which was under pump pressure, now becomes bleed through duct 69, while cylinder space 66, which was in bleed, now becomes overlap pressure through ducts 292, 293, 294, 225, 226, and 68. Now if the pressure in cylinder space 66 were permitted to build up at this point to variable pressure, it would cause cone clutch surface 56 of cone clutch G to complete its engagement to the cone clutch surface 50 of planetary ring gear 49 and the transmission would have made a shift from second speed to fourth speed. But the pressure in cylinder space 66 at this time is dictated by the overlap valve 118 and will be below variable pressure.

As variable pressure is admitted into cylinder space 66 the overlap valve spring 119 determines the amount of pressure that will be effective on the cone clutch G before the overlap valve 118 shifts to release the front planetary unit for ratio. Here, as on the governor valve 98, the right hand end of valve 118 as shown in the drawings is formed with an end recess 118a defining an area less than the cross-sectional area of the valve against which fluid under pressure from duct 130 initially acts to insure a complete shift once the spring 119 is initially overcome. The so-called overlap pressure used at this time is only to insure the starting engagement of the rear cone clutch ahead of release of the front cone clutch. Such an overlap may not be necessary when the clutches are new, but if one wears more than the other there might be enough delay in the movement effected through the cylinder space 66 to cause the cylinder space 34 to bleed first, thus very momentarily causing a shift from second speed to first speed before third speed is completed. If, on the other hand, the cone G engages the cone clutch surface 50 too far ahead of the release of cone F from cone clutch surface 24, then a shift from second to fourth will have been made. Thus, the shift from second to third is made without breaking the drive line and the progression of shift may be termed first, second, third plus, third and fourth.

*Third speed—throttle open—shift completed*

This position is obtained without further movement of the manual shift valve 135 from the position previously described. The overlap valve 118, however, has shifted hydraulically to the position illustrated in Figure 8 to complete the shift to third speed.

The cylinder space 34, which was variable pressure, is now in bleed through duct 36, and pump pressure enters cylinder space 35 through ducts 276, 277, 127, 128, and 37 to cause the front planetary set to be in ratio during drive and prevents free wheeling during coast. Cylinder space 66, which was under overlap pressure, is now under variable pressure through ducts 292, 293, 294, 225, 226, and 68, and the opposite cylinder space 67 is in bleed through duct 69. The transmission is now in third speed through the front planetary gear set only. If the accelerator is released while in this speed, the cylinder space 66 will receive pressure from the constant pressure valve at 301 sufficient to hold the clutch G engaged, which in turn will prevent the car from free wheeling when variable pressure valve 244 is closed to a point where the variable pressure is less than that dictated by constant pressure valve 301.

*Fourth speed—throttle open*

This speed is obtained by moving the manual shift valve 135 to the position illustrated in Figure 9. The cylinder space 66 remains under variable pressure while the opposed cylinder space 67 remains in bleed. The overlap valve 118, which was held over by variable pressure, is now in bleed and has shifted to its normal position. The cylinder space 34, which was in bleed, is under variable pressure through ducts 292, 293, 124, 125, 212, 213, and 36. The opposite cylinder space 35, which was under pump pressure, is now in bleed. Since the cone clutch surface 56 of clutch G was already engaged with the cone clutch surface 50 of the ring gear 49 of gear set B, the cylinder space 34 builds up pressure until the associated cone clutch F lifts the load from the helical spring brake D, and the transmission is then in fourth speed or direct. If the accelerator is released while in this speed, the variable pressure line becomes constant pressure through the constant pressure valve, thus preventing the clutches from releasing.

*Reverse speed—throttle open*

This drive is obtained by moving the manual shift valve 135 to its reverse position, as illustrated in Figure 10. Pump pressure enters the cylinder space 88 through ducts 276, 277, 278, 238, 239, and 89 to connect the jaw brake H to the case or housing L. The rear pump P' is now running backwards and will no longer furnish part of the fluid pressure, and, in fact, might have a tendency to pull oil from the pressure line 275 were it not prevented from doing so by the check valve 265. Also, line 296 becomes inactive, which automatically prevents a governor shift at 10 M. P. H. Variable pressure now enters cylinder spaces 35 and 66 through ducts 292, 293, 230, 231, and 37, and ducts 292, 293, 294, 225, 226, and 68, respectively. Cylinder spaces 34 and 67 are in bleed. Less pressure is required in space 35 to hold brake surfaces 10 and 11 of the brake and clutch means F in engagement than in space 66 to engage clutch surfaces 50 and 56 of the brake and clutch means G since in holding the reaction of sun gear 20 of planetary gear mechanism A only a small percentage of engine torque is involved as compared to engine torque in locking up the sun gear 47 with the ring gear 49 of planetary gear mechanism B. Thus engagement of brake surfaces 10 and 11 of brake and clutch means F is effected first followed by engagement of clutch surfaces 50 and 66 of brake and clutch means G upon admission of variable pressure to spaces 35 and 66 causing the car to move in reverse through a high overall ratio, but only momentarily and until the latter clutch surfaces are engaged. As the pressure in cylinder space 66 increases sufficiently to tie up the second planetary gear set B into direct, then a second but lower overall ratio comes in to complete the shift and the transmission is in reverse through the first and third planetaries.

The two speeds in reverse may prove valuable during parking when the driver wishes to inch the car.

*Towing car to start engine—shift lever in fourth speed*

In towing the car to start the engine the manual shift valve 135 is moved to fourth speed position as illustrated in Figure 11 only after the car is moving above about 10 M. P. H. If the throttle is open sufficient to overcome pressure in the constant pressure valve 301, then variable pressure enters cylinder spaces 34 and 66 to engage clutches F and G in direct, cylinder spaces 35 and 67 being in bleed. If the throttle remains closed, then the constant pressure valve at 301 takes over and engages the same clutches F and G.

If the manual shift valve 135 is moved to second, third, or fourth speed position before approximately 10 M. P. H. is attained, then pressure will enter cylinder 260 and the rear pump

259 will build up sufficient pressure to force the manual shift valve 135 back to first speed position where the car will free wheel. As soon as the engine turns over, the front pump 258 adds to the system, as in normal forward driving.

*Downshift from fourth to third—throttle open*

Downshift from fourth to third speed with the throttle open is accomplished by moving the manual shift valve 135 from fourth speed position to its third speed position as illustrated in Figure 8.

The variable pressure remains on cylinder space 66, while cylinder space 67 remains in bleed. Cylinder space 34 changes from variable pressure to bleed, while cylinder space 35 changes from bleed to pump pressure. At the instant the pressure drops off in cylinder space 34 sufficiently to permit the clutch F to release, then the engine torque delivered at that time begins to slow the revolving cone down to a stop. When the cone is stopped, any further movements backward will be stopped at the helical spring brake D to complete the drive through ratio in the first planetary gear set.

*Downshift from fourth to third—throttle closed*

Downshift from fourth to third with the throttle closed is accomplished the same as above except as follows:

When cylinder space 34 transforms to bleed, the cone clutch will increase in speed in the same direction as the engine, and the car will free wheel for that interval of time that it takes the pressure in cylinder space 35 to engage the cone of planetary gear set A with the cone 10 on the case or housing L with sufficient pressure to prevent free wheeling.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

We claim:

1. For use in a transmission having gear means providing a plurality of forward ratio drives between drive and driven shafts thereof, and torque transmitting means associated with said gear means for selectively effecting said forward ratio drives through the latter, control means comprising manually shiftable valve means having a neutral position and shiftable from said neutral position to a plurality of forward positions to control selectively actuation of said torque transmitting means to effect said forward ratio drives, throttle control valve means operable between opened and closed positions, and means between said throttle control valve means and said manually shiftable valve means for preventing shifting of the latter when said throttle control valve means is in closed position except to effect one forward ratio drive.

2. For use in a transmission having gear means providing a plurality of forward ratio drives between drive and driven shafts thereof, and fluid responsive torque transmitting means associated with said gear means for selectively effecting said forward drive ratios through the latter, control means adapted to have connection with a source of fluid under pressure comprising manually shiftable valve means having a neutral position and shiftable from said neutral position to a plurality of forward positions to connect said source of fluid under pressure with said torque transmitting means to control selectively the actuation of the latter to effect said forward ratio drives, throttle control valve means manually operable between opened and closed positions, and fluid responsive means between said throttle control valve means and said manually shiftable valve means for preventing shifting of the latter from its neutral position when said throttle control valve means is in closed position except to effect one forward ratio drive through said gear means.

3. For use in a transmission having gear means providing a plurality of forward ratio drives and reverse drive between drive and driven shafts thereof, and torque transmitting means associated with said gear means for selectively affecting said forward ratio drives and said reverse drive through the latter, control means comprising manually shiftable valve means having a neutral position and shiftable from said neutral position to a plurality of forward positions and to a rearward position to control selectively actuation of said torque transmitting means to effect said forward ratio drives and said reverse drive, respectively, throttle control valve means operable between opened and closed positions, and means between said throttle control valve means and said manually shiftable valve means for preventing shifting of the latter when said throttle control valve means is in closed position except to effect one forward ratio drive or reverse drive.

4. For use in a transmission having gear means providing a plurality of forward ratio drives and reverse drive between drive and driven shafts thereof, and fluid pressure responsive torque transmitting means associated with said gear means for selectively effecting said forward ratio drives and said reverse drive through the latter, control means adapted to have connection with a source of fluid under pressure comprising manually shiftable valve means having a neutral position and shiftable from said neutral position to a plurality of forward positions and to a rearward position to connect said source of fluid under pressure with said torque transmitting means to control selectively actuation of the latter to effect said forward ratio drives and said reverse drive, throttle control valve means manually operable between opened and closed positions, and fluid pressure responsive means between said throttle control valve means and said manually shiftable valve means for preventing shifting of the latter from its neutral position when said throttle control valve means is in closed position except to effect one forward ratio drive or reverse drive.

5. For use in a transmission having gear means providing a plurality of forward ratio drives and reverse drive between drive and driven shafts thereof, and torque transmitting means associated with said gear means for selectively effecting said forward ratio drives and said reverse drive through the latter, control means comprising manually shiftable valve means having a neutral position and shiftable from said neutral position to a plurality of forward positions and to a rearward position to control selectively actuation of said torque transmitting means to affect said forward ratio drives and said reverse drive, throttle control valve means operable between opened and closed positions, and means between said throttle control valve means and said manually shiftable valve means for preventing shifting of the latter when said throttle control valve means is in opened position.

6. For use in a transmission having gear means providing a plurality of forward ratio drives and reverse drive between drive and driven shafts thereof, and fluid pressure responsive torque transmitting means associated with said gear means for selectively effecting said forward ratio drives and said reverse drive through the latter, control means adapted to have connection with a source of fluid under pressure comprising, manually shiftable valve means having a neutral position and shiftable from said neutral position to a plurality of forward positions and to a rearward position to connect said source of fluid under pressure with said torque transmitting means to control selectively actuation of the latter to effect said forward ratio drives and said reverse drive, throttle control valve means manually operable between opened and closed positions, and fluid pressure responsive means between said throttle control valve means and said manually shiftable valve means for preventing shifting of the latter from its neutral position when said throttle control valve means is in opened position.

7. For use in a transmission having gear means providing a plurality of forward ratio drives and reverse drive between drive and driven shafts thereof, and fluid pressure responsive torque transmitting means associated with said gear means for selectively effecting said forward ratio drives and said reverse drive through the latter, control means adapted to have connection with a source of fluid under pressure comprising manually shiftable valve means including a piston means having a neutral position and shiftable from said neutral position to a first forward position and a rearward position to dispose said piston means to connect said source of fluid under pressure with said torque transmitting means to effect, respectively, a first forward ratio drive and reverse drive, said manually shiftable valve means being shiftable from said first forward position to other forward positions to connect said source of fluid under pressure with said torque transmitting means to effect the other of said forward ratio drives, throttle control valve means manually operable between opened and closed positions, and fluid responsive means between said throttle control valve means and said manually shiftable valve means for preventing shifting of the latter from neutral, said first forward position, or said rearward position to said other forward positions when said throttle control valve means is in closed position.

8. For use in a transmission having gear means providing a plurality of forward ratio drives and reverse drive between drive and driven shafts thereof, and fluid pressure responsive torque transmitting means associated with said gear means for selectively effecting said forward ratio drives and said reverse drive through the latter, control means adapted to have connection with a source of fluid under pressure comprising, manually shiftable valve means including a piston means having a neutral position and shiftable from said neutral position to a first forward position and a rearward position to dispose said piston means to connect said source of fluid under pressure with said torque transmitting means to effect, respectively, a first forward ratio drive or reverse drive, said manually shiftable valve means being shiftable from said first forward position to other forward positions to connect said source of fluid under pressure with said torque transmitting means to effect the other of said forward ratio drives, throttle control valve means manually operable between opened and closed positions, and fluid pressure responsive means between said throttle control valve means and said manually shiftable valve means for preventing shifting of the latter from neutral position to other positions when said throttle control valve means is in opened position.

9. For use in a transmission having gear means providing a plurality of forward ratio drives and reverse drive between drive and driven shafts thereof, and torque transmitting means associated with said gear means for selectively effecting said forward ratio drives and said reverse drive through the latter, control means comprising, manually shiftable valve means having a neutral position and shiftable from said neutral position to a plurality of forward positions and to a rearward position to control selectively actuation of said torque transmitting means to effect, respectively, said forward ratio drives and said reverse drive, throttle control valve means operable between opened and closed positions, means between said throttle control valve means and said manually shiftable valve means for preventing shifting of the latter when said throttle control valve means is in closed position except to effect one forward ratio drive or reverse drive, and means including a governor associated with said drive shaft adapted upon a predetermined speed of rotation of the latter for rendering said last named means inoperative.

10. For use in a transmission having gear means providing a plurality of forward ratio drives and reverse drive between drive and driven shafts thereof, and fluid pressure responsive torque transmitting means associated with said gear means for selectively effecting said forward ratio drives and said reverse drive through the latter, control means adapted to have connection with a source of fluid under pressure comprising, manually shiftable valve means having a neutral position and shiftable from said neutral position to a plurality of forward positions and to a rearward position to connect said source of fluid under pressure with said torque transmitting means to control selectively the actuation of the latter to affect said forward ratio drives and said reverse drive, throttle control valve means manually operable between opened and closed positions, fluid pressure responsive means between said throttle control valve means and said manually shiftable valve means for preventing shifting of the latter from its neutral position when said throttle control valve means is in closed position except to effect one forward ratio drive or reverse drive, and means including a governor associated with said drive shaft and governor valve means associated with said fluid pressure responsive means adapted upon a predetermined speed of rotation of said driven shaft to effect disconnection of said fluid pressure responsive means with the source of fluid under pressure.

11. For use in a transmission having gear means providing a plurality of forward ratio drives and reverse drive between drive and driven shafts thereof, and fluid pressure responsive torque transmitting means associated with said gear means for selectively effecting said forward ratio drives and said reverse drive through the latter, control means comprising first pump means adapted to be driven by said drive shaft providing a first source of fluid under pressure, second pump means adapted to be driven by said driven shaft and providing a second source of fluid under pressure, manually shiftable valve means having a neutral position and shiftable from said neutral position to a plurality of forward positions and reverse position to connect said first source of fluid under pressure with said torque transmitting means to control selectively actuation of the latter to effect said forward ratio drives and said reverse drive, throttle control valve means manually operable between opened and closed positions, fluid pressure responsive means between said throttle control valve means and said manually shiftable valve means for preventing shifting of the latter from neutral position when said throttle control valve means is in closed position except to effect one forward ratio drive or reverse drive, and means including a governor associated with said driven shaft and governor valve means associated with said fluid responsive means adapted to a predetermined speed of rotation of said driven shaft to connect said second source of fluid under pressure with said governor valve means to actuate the same and thereby effect disconnection of said fluid pressure responsive means from said first source of fluid under pressure.

12. For use in a transmission having gear means providing a plurality of forward ratio drives and reverse drive between drive and driven shafts thereof, and fluid pressure responsive torque transmitting means associated with said gear means for selectively effecting said forward ratio drives and said reverse drive through the latter, brake means adapted to be conditioned for actuation by fluid under pressure associated with said gear means for preventing breaking of the drive line in effecting a change from one forward gear ratio to a second forward gear ratio, control means comprising first pump means adapted to be driven by said drive shaft and providing a first source of fluid under pressure, second pump means adapted to be driven by said driven shaft and providing a second source of fluid under pressure, manually shiftable valve means having a neutral position and shiftable from said neutral position to a plurality of forward positions and reverse position to connect said first source of fluid under pressure with said torque transmitting means to control selectively actuation of the latter to effect said forward ratio drives and said reverse drive, throttle control valve means manually operable between opened and closed positions, fluid pressure responsive means between said throttle control valve means and said manually shiftable valve means for preventing shifting of the latter from neutral position when said throttle control valve means is in closed position except to effect one forward ratio drive or reverse drive, means including a governor associated with said driven shaft and governor valve means associated with said fluid responsive means adapted at a predetermined speed of rotation of said driven shaft to connect said second source of fluid under pressure with said governor valve means to actuate the same and thereby effect disconnection of said fluid pressure responsive means from said first source of fluid under pressure, and said governor valve means when actuated effecting connection of said brake means with said first source of fluid under pressure.

13. For use in a transmission having gear means providing a plurality of forward ratio drives between drive and driven shafts thereof, and a pair of fluid pressure responsive torque transmitting means associated with said gear means for selectively effecting said forward ratio drive through the latter, control means comprising first pump means adapted to be driven by said drive shaft providing a first source of fluid under pressure, second pump means adapted to be driven by said shaft providing a second source of fluid under pressure, manually shiftable valve means having a neutral position and shiftable from said neutral position to a plurality of forward positions to connect said first source of fluid under pressure to said fluid responsive torque transmitting means to control selectively actuation of the latter to effect said forward ratio drives, means including a governor associated with said driven shaft and a governor control valve associated with said second source of fluid under pressure adapted upon a predetermined speed of rotation of said driven shaft to connect said first source of fluid under pressure with one of said pair of fluid pressure responsive torque transmitting means, throttle control valve means manually operable between opened and closed positions and in the opened position of the latter connecting said first source of fluid under pressure with the other of said pair of fluid pressure responsive torque transmitting means, and normally closed constant pressure valve means associated with said first source of fluid under pressure adapted upon closing of said throttle control valve means to be opened by the pressure of the first fluid pressure source to maintain the connection of said other fluid pressure responsive torque transmitting means with said first source of fluid under pressure.

14. For use in a transmission having gear means providing a plurality of forward ratio drives between drive and driven shafts thereof, a pair of fluid pressure responsive torque transmitting means each having clutch and brake elements and being associated with said gear means for selectively effecting said forward drive ratios through the latter, control means comprising a source of fluid under pressure, manually shiftable valve means having a neutral position and shiftable from said neutral position to a plurality of forward positions to connect said source of fluid under pressure to said pressure responsive torque transmitting means to control selectively actuation of the latter to effect said forward ratio drives, throttle control valve means associated with said source of fluid under pressure and manually operable between opened and closed positions, said manually shiftable valve means in one forward position thereof effecting connection of said fluid pressure source with one of the brake and clutch elements of each of said pair of fluid pressure responsive torque transmitting means, said manually shiftable valve means upon shifting thereof from said one forward position to a second forward position thereof with said throttle control valve means in opened position effecting disconnection of said source of fluid under pressure from said one element of one of said pair of torque transmitting means and connecting the other element thereof with said fluid pressure source, and overlap valve means associated with said throttle control valve means adapted upon actuation of said manually shiftable valve means to its last named position providing for beginning the disconnection of the fluid pressure source from said one element of said other torque transmitting means subsequent to connection of said other element of said one torque transmitting means with said fluid pressure source and thereafter effecting the connecting of said fluid pressure source with the other element of said other torque transmitting means.

15. For use in a transmission having gear means providing a plurality of forward ratio drives between drive and driven shafts thereof, a pair of fluid pressure responsive torque transmitting means each having clutch and brake elements and being associated with said gear means for selectively effecting said forward drive ratios through the latter, control means comprising a source of fluid under pressure, manually shiftable valve means having a neutral position and shiftable from said neutral position to a plurality of forward positions to connect said source of fluid under pressure to said pressure responsive torque transmitting means to control selectively actuation of the latter to effect said forward ratio drives, throttle control valve means associated with said source of fluid under pressure and manually operable between opened and closed positions, said manually shiftable valve means in one forward position thereof effecting connection of said fluid pressure source with one of the brake and clutch elements of each of said pair of fluid pressure responsive torque transmitting means, said manually shiftable valve means upon shifting thereof from said one forward position to a second forward position thereof with said throttle valve means in opened position effecting disconnection of said source of fluid under pressure from said one element of one of said pair of torque transmitting means and connecting the other element thereof with said fluid pressure source, overlap valve means associated with said throttle control valve means adapted upon actuation of said manually shiftable valve means to its last named position providing for beginning the disconnection of the fluid pressure source from said one element of said other torque transmitting means subsequent to connection of said other element of said one torque transmitting means with said fluid pressure source and thereafter effecting the connection of said fluid pressure source with the other element of said other torque transmitting means, and normally closed constant pressure valve means associated with said fluid pressure source adapted upon closing of said throttle control valve means to be opened by the pressure of said fluid pressure source to maintain connection of said other element of said one pressure responsive torque transmitting means with said fluid pressure source.

16. For use in a transmission having gear means providing a plurality of forward ratio drives between drive and driven shafts thereof, a pair of fluid pressure responsive torque transmitting means each including clutch and brake means associated with said gear means for selectively effecting said forward ratio drives through the latter, control means adapted to have connection with a source of fluid under pressure comprising, throttle control valve means manually operable to opened and closed positions, manually shiftable valve means having a neutral position and shiftable from said neutral position to a predetermined forward position with said throttle control valve means in opened position to connect said clutches of said pair of torque transmitting means with said fluid pressure sources, and constant pressure valve means associated with said fluid pressure source adapted upon closing of said throttle control valve means to be opened by the pressure of the fluid of said pressure source to maintain the connection of said clutches of said pair of torque transmitting means with said fluid pressure source.

17. For use in a transmission having gear means providing a plurality of forward ratio drives between drive and driven shafts thereof, and fluid pressure responsive torque transmitting means associated with said gear means for selectively effecting said forward ratio drives, control means comprising a pump adapted to be driven by said driven shaft for supplying a source of fluid under pressure, manually shiftable valve means for connecting said fluid pressure source with said torque transmitting means to effect one forward ratio drive through said gear means, and means including a governor associated with said driven shaft and a governor control valve associated with said manually shiftable valve means adapted upon a predetermined speed of rotation of said driven shaft to connect said fluid pressure source with said manually shiftable valve means to position the latter for effecting a second forward drive ratio through said gear means.

HARRY R. GREENLEE.
WOODROW A. HASBANY.

REFERENCES CITED

The following references are of record in the file of this patent:

UNITED STATES PATENTS

| Number | Name | Date |
|---|---|---|
| 2,021,550 | Haycock | Nov. 19, 1935 |
| 2,034,087 | Chilton | Mar. 17, 1936 |
| 2,102,634 | Lysholm | Dec. 21, 1937 |
| 2,103,540 | Livermore | Dec. 28, 1937 |
| 2,203,296 | Fleischel | June 4, 1940 |
| 2,223,716 | Bojesen | Dec. 3, 1940 |
| 2,298,648 | Russell | Oct. 13, 1942 |
| 2,329,724 | Maurer | Sept. 21, 1943 |
| 2,349,410 | Normanville | May 23, 1944 |
| 2,354,257 | Greenlee | July 25, 1944 |
| 2,373,122 | La Brie | Apr. 10, 1945 |
| 2,407,289 | La Brie | Sept. 10, 1946 |
| 2,410,921 | Avila | Nov. 12, 1946 |